US011929046B2

(12) United States Patent
Shih

(10) Patent No.: US 11,929,046 B2
(45) Date of Patent: Mar. 12, 2024

(54) ELECTRONIC DEVICE AND OPERATION METHOD OF ELECTRONIC DEVICE

(71) Applicant: Innolux Corporation, Miaoli County (TW)

(72) Inventor: Ching-Wen Shih, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/087,817

(22) Filed: Dec. 23, 2022

(65) Prior Publication Data

US 2023/0245631 A1 Aug. 3, 2023

(30) Foreign Application Priority Data

Jan. 28, 2022 (CN) ......................... 202210106071.4

(51) Int. Cl.
*G09G 3/36* (2006.01)

(52) U.S. Cl.
CPC ... *G09G 3/3688* (2013.01); *G09G 2310/0289* (2013.01)

(58) Field of Classification Search
CPC ..................... G09G 3/3688; G09G 2310/0289
See application file for complete search history.

(56) References Cited

U.S. PATENT DOCUMENTS

| | | | | |
|---|---|---|---|---|
| 11,151,956 | B1 * | 10/2021 | Iwase | G09G 3/3688 |
| 2006/0267911 | A1 * | 11/2006 | Jang | G11C 19/28 345/100 |
| 2008/0170064 | A1 * | 7/2008 | Lee | G09G 3/3677 345/87 |
| 2011/0148825 | A1 * | 6/2011 | Ueno | G09G 3/3677 345/204 |
| 2012/0062528 | A1 * | 3/2012 | Kimura | G09G 3/3648 345/204 |
| 2016/0018844 | A1 * | 1/2016 | Sasaki | G11C 19/28 713/600 |
| 2017/0123284 | A1 * | 5/2017 | Lee | G02F 1/136259 |
| 2019/0180690 | A1 * | 6/2019 | Kim | H10K 59/131 |

(Continued)

FOREIGN PATENT DOCUMENTS

| | | |
|---|---|---|
| KR | 20200046645 | 5/2020 |
| TW | 737293 | 8/2021 |

OTHER PUBLICATIONS

"Office Action of Taiwan Counterpart Application", dated Jun. 2, 2023, p. 1-p. 5.

*Primary Examiner* — David Tung
(74) *Attorney, Agent, or Firm* — JCIPRNET

(57) ABSTRACT

An electronic device including a substrate, a first signal line, a second signal line, a third signal line, a first level shifter, and a second level shifter is provided. The first signal line, the second signal line, and the third signal line are disposed on the substrate. Each of the first signal line, the second signal line, and the third signal line has two endpoints. The second signal line is disposed between the first signal line and the third signal line. The first level shifter is coupled to the first signal line and the third signal line. The second level shifter is coupled to the second signal line. The first level shifter is coupled to the two endpoints of the first signal line and the two endpoints of the third signal line. The second level shifter is coupled to the two endpoints of the second signal line.

18 Claims, 6 Drawing Sheets

(56) References Cited

U.S. PATENT DOCUMENTS

| | | | | |
|---|---|---|---|---|
| 2021/0020137 | A1* | 1/2021 | Jang | G09G 3/3688 |
| 2022/0139325 | A1* | 5/2022 | Lee | G06F 3/147 345/694 |

* cited by examiner

ELECTRONIC DEVICE AND OPERATION METHOD OF ELECTRONIC DEVICE

CROSS-REFERENCE TO RELATED APPLICATION

This application claims the priority benefit of China application serial no. 202210106071.4, filed on Jan. 28, 2022. The entirety of the above-mentioned patent application is hereby incorporated by reference herein and made a part of this specification.

BACKGROUND

Technical Field

The disclosure relates to an electronic device and an operation method of the electronic device.

Description of Related Art

In an existing electronic device, such as a display apparatus, a level shifter is used to drive a gate circuit. As the resolution of the display apparatus becomes higher and higher, the number of frequency signals required to drive the gate circuit also increases. When the number of frequency signals continues to increase, multiple level shifters will be connected in series to sequentially output the required number of frequency signals and control the cost. However, such a structure is easy to cause the level shifter to accumulate a large amount of thermal energy in a short period of time, resulting in an issue affecting the stability of the electronic device.

SUMMARY

The disclosure provides an electronic device and an operation method thereof, especially an electronic device with a display panel, which may avoid the load of the display panel from being too high to affect the operation stability and cause an issue affecting the stability of the electronic device, that is, the electronic device is continuously operated, and the temperature rise is relatively alleviated.

An electronic device in the disclosure includes a substrate, a first signal line, a second signal line, a third signal line, a first level shifter, and a second level shifter. The first signal line, the second signal line, and the third signal line are disposed on the substrate. Each of the first signal line, the second signal line, and the third signal line has two endpoints. The second signal line is disposed between the first signal line and the third signal line. The first level shifter is coupled to the first signal line and the third signal line. The second level shifter is coupled to the second signal line. The first level shifter is coupled to the two endpoints of the first signal line and the two endpoints of the third signal line. The second level shifter is coupled to the two endpoints of the second signal line.

In an embodiment of the disclosure, the first level shifter outputs multiple first frequency signals, and the second level shifter outputs multiple second frequency signals. The first of the first frequency signals and the first of the second frequency signals partially overlap in time.

In an embodiment of the disclosure, the first frequency signals do not overlap one another in time.

In an embodiment of the disclosure, the second frequency signals do not overlap one another in time.

In an embodiment of the disclosure, the first level shifter outputs multiple first frequency signals, and the second level shifter outputs multiple second frequency signals. The first of the first frequency signals and the first of the second frequency signals completely overlap in time.

In an embodiment of the disclosure, the first frequency signals partially overlap one another in time.

In an embodiment of the disclosure, the second frequency signals partially overlap one another in time.

In an embodiment of the disclosure, the first level shifter outputs multiple first frequency signals, and the second level shifter outputs multiple second frequency signals. The first frequency signals and the second frequency signals are input from two opposite sides of the substrate.

In an embodiment of the disclosure, the first frequency signals and the second frequency signals are input from the two opposite sides of the substrate in a same order.

In an embodiment of the disclosure, the first frequency signals and the second frequency signals are input from the two opposite sides of the substrate in an opposite order.

An operation method of an electronic device in the disclosure includes the following. Multiple first frequency signals are output through a first level shifter. Multiple second frequency signals are output through a second level shifter. The first of the first frequency signals and the first of the second frequency signals at least partially overlap in time.

In order for aforementioned content to be more comprehensible, several embodiments accompanied with drawings are described in detail below.

DETAILED DESCRIPTION OF DISCLOSED EMBODIMENTS

Figure 1:
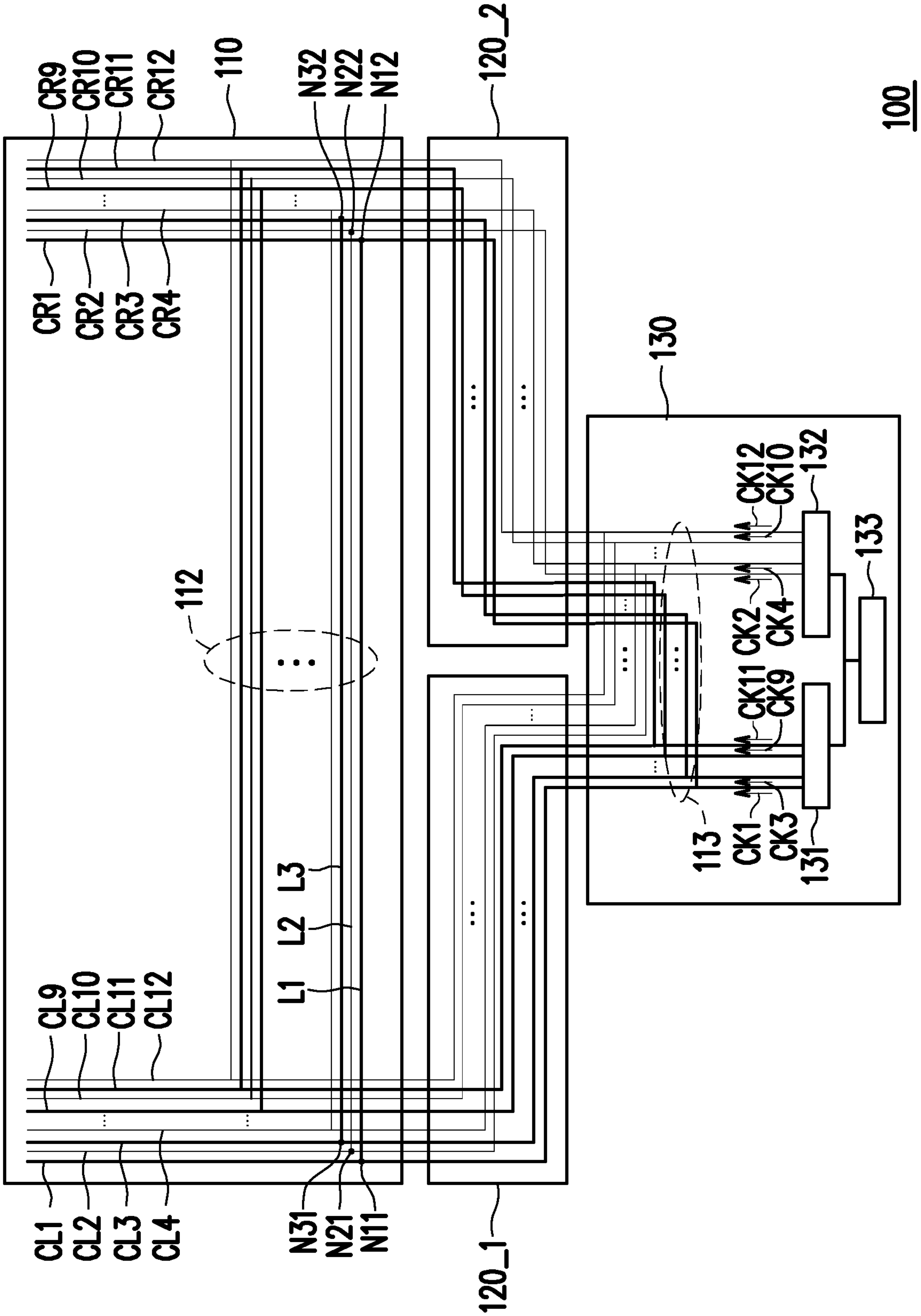
FIG. 1 is a schematic block view of an electronic device according to an embodiment of the disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific components in the drawings are not drawn according to actual scale. In addition, the number and size of each component in the drawings are only for exemplary purpose, and are not intended to limit the scope of the disclosure.

In the following description and claims, the terms "contain" and "include" are open-ended terms, so they should be interpreted as "include but not limited to . . . ".

It should be understood that although the terms such as first, second, and third may be used to describe various components, the components are not limited to the terms. The terms are merely used to distinguish a single component from other components in the specification. Different terms may be used in the claims, and replaced by first, second, third, etc. in the order in which the components are declared in the claims. Therefore, in the following specification, the first component may be the second component in the claims.

In some embodiments of the disclosure, the terms such as "connect", "interconnect", etc. regarding bonding and connection, unless otherwise defined, may indicate that two structures are in direct contact, or may also indicate that the two structures are not in direct contact, and there are other structures located therebetween. In addition, the terms regarding bonding and connection may also include the case where both structures are movable, or both structures are fixed. Furthermore, the term "couple" includes any direct and indirect means of electrical connection.

The electronic device in the disclosure may include a display device, an antenna device, a sensing device, a lighting device, or a splicing device, but the disclosure is not limited thereto. The electronic device may include bendable or flexible electronic devices. The electronic device may include electronic elements. The electronic device includes, for example, a liquid crystal layer or a light emitting diode (LED). The electronic elements may include passive devices and active devices, such as capacitors, resistors, inductors, variable capacitors, filters, diodes, transistors, sensors, MEMS devices, liquid crystal chips, and controllers, but the disclosure is not limited thereto. The diodes may include light emitting diodes or photodiodes. The light emitting diodes may include, for example, organic light emitting diodes (OLEDs), mini LEDs, micro LEDs, quantum dot LEDs, fluorescence, phosphor, other suitable materials, or a combination of the above, but the disclosure is not limited thereto. The sensors may include, for example, capacitive sensors, optical sensors, electromagnetic sensors, fingerprint sensors (FPS), touch sensors, antennas, pen sensors, etc., but the disclosure is not limited thereto. The controllers may include, for example, timing controllers, etc., but the disclosure is not limited thereto. Hereinafter, the disclosure will be described by taking the display device as the electronic device, but the disclosure is not limited thereto.

Reference will now be made in detail to the exemplary embodiments of the disclosure, and examples of the exemplary embodiments are illustrated in the accompanying drawings. Whenever possible, the same reference numerals are used in the drawings and descriptions to refer to the same or similar parts.

FIG. 1 is a schematic block view of an electronic device according to an embodiment of the disclosure. Referring to FIG. 1, an electronic device 100 includes a substrate 110, multiple signal lines 112, a first level shifter 131, and a second level shifter 132. The signal line 112 includes a first signal line L1, a second signal line L2, and a third signal line L3 disposed on the substrate 110. The second signal line L2 is disposed between the first signal line L1 and the third signal line L3. The first level shifter 131 is coupled to the first signal line L1 and the third signal line L3. The second level shifter 132 is coupled to the second signal line L2.

Each of the first signal line L1, the second signal line L2, and the third signal line L3 has two endpoints. Specifically, the first signal line L1 has an endpoint N11 and an endpoint N12. The second signal line L2 has an endpoint N21 and an endpoint N22. The third signal line L3 has an endpoint N31 and an endpoint N32. The first level shifter 131 is coupled to the endpoint N11 and the endpoint N12 of the first signal line L1 and the endpoint N31 and the endpoint N32 of the third signal line L3. The second level shifter 132 is coupled to the endpoint N21 and the endpoint N22 of the second signal line L2.

In this embodiment, the first level shifter 131 is configured to output multiple first frequency signals CK1, CK3, CK5, CK7, CK9, and CK11, and apply the first frequency signals CK1, CK3, CK5, CK7, CK9, and CK11 to some of the signal lines 112. For example, the first frequency signal CK1 is applied to the first signal line L1, and the first frequency signal CK3 is applied to the third signal line L3. The second level shifter 132 is configured to output multiple second frequency signals CK2, CK4, CK6, CK8, CK10, and CK12, and apply the second frequency signals CK2, CK4, CK6, CK8, CK10, and CK12 to another some of the signal lines 112. For example, the second frequency signal CK2 is applied to the second signal line L2. In other embodiments, the number of first frequency signals that the first level shifter 131 may output may not be equal to 6, and the number of second frequency signals that the second level shifter 132 may output may not be equal to 6, for example, 4 frequency signals or 8 frequency signals, but the disclosure is not limited thereto.

In this embodiment, the first frequency signals CK1, CK3, CK5, CK7, CK9, and CK11 and the second frequency signals CK2, CK4, CK6, CK8, CK10, and CK12 may be input from two opposite sides of the substrate 110 through correspondingly coupled frequency signal lines. For example, the first frequency signals CK1, CK3, CK5, CK7, CK9, and CK11 and the second frequency signals CK2, CK4, CK6, CK8, CK10, and CK12 are input to the substrate 110 from a left side of the substrate 110 through frequency signal lines CL1, CL2, CL3, CL4, CL5, CL6, CL7, CL8, CL9, CL10, CL11, and CL12 arranged on the substrate 110 in a first order. At the same time, the first frequency signals CK1, CK3, CK5, CK7, CK9, and CK11 and the second frequency signals CK2, CK4, CK6, CK8, CK10, and CK12 are also input to the substrate 110 from a right side of the substrate 110 through frequency signal lines CR1, CR2, CR3, CR4, CR5, CR6, CR7, CR8, CR9, CR10, CR11, and CR12 arranged on the substrate 110 in the first order. That is to say, in this embodiment, the frequency signal lines inputting the first frequency signals CK1, CK3, CK5, CK7, CK9, and CK11 and the frequency signal lines inputting the second frequency signals CK2, CK4, CK6, CK8, CK10, and CK12 are arranged on the two opposite sides of the substrate 110 in the same order, from left to right are CL1, CL2, CL3, CL4, CL5, CL6, CL7, CL8, CL9, CL10, CL11, and CL12 and CR1, CR2, CR3, CR4, CR5, CR6, CR7, CR8, CR9, CR10, CR11, and CR12 in the first order.

In this embodiment, the substrate 110 is, for example, an active substrate in the display device, but the disclosure is not limited thereto. The active substrate includes multiple pixel circuits. The signal line 112 is, for example, a gate line connected to a corresponding active device in the pixel circuit, such as a transistor. The first frequency signals CK1, CK3, CK5, CK7, CK9, and CK11, and the second frequency signals CK2, CK4, CK6, CK8, CK10, and CK12 are, for example, gate signals configured to control a turned-on state of the transistor.

In this embodiment, a connection line 113 is coupled to the frequency signal lines on the substrate 110 through a circuit board 120_1 and a circuit board 120_2, for example. The circuit board 120_1 and the circuit board 120_2 may be a flexible circuit board or a rigid circuit board, but the disclosure is not limited thereto. Therefore, the signal line 112 may be coupled to the first level shifter 131 or the second level shifter 132 through the frequency signal line and the correspondingly coupled connection line 113. For example, the first signal line L1 may be coupled to the first level shifter 131 through the frequency signal line CL1 and/or the frequency signal line CR1 and the correspondingly coupled connection line 113, and the second signal line L2 may be coupled to the second level shifter 132 through the frequency signal line CL2 and/or the frequency signal line CR2 and the correspondingly coupled connection line 113. A driving circuit board 130 may include a timing controller 133, but the disclosure is not limited thereto. The first level shifter 131 and the second level shifter 132 are disposed on the driving circuit board 130, but the disclosure is not limited thereto. The timing controller 133 may be configured to control operations of the first level shifter 131 and the second level shifter 132. The first level shifter 131, the second level shifter 132, and the timing controller 133 may be integrated into a single circuit chip or implemented as different circuit chips, but the disclosure is not limited thereto.

In this embodiment, the first level shifter 131 and the second level shifter 132 may alternately output the first frequency signals and the second frequency signals, and may input the first frequency signals and the second frequency signals from the two opposite sides of the substrate 110 through the connection line 113 and the correspondingly coupled frequency signal line. In this embodiment, each of the signal lines 112 is coupled to the frequency signal line through the two endpoints to receive the frequency signals from the two opposite sides of the substrate 110, which may reduce abnormal switching of the transistor coupled to the signal line 112 due to the signal line 112 being too long and the load being too high on the large-sized substrate 110, thereby reducing an issue that optical characteristics of the electronic device 100 do not meet the requirements.

Figure 2:
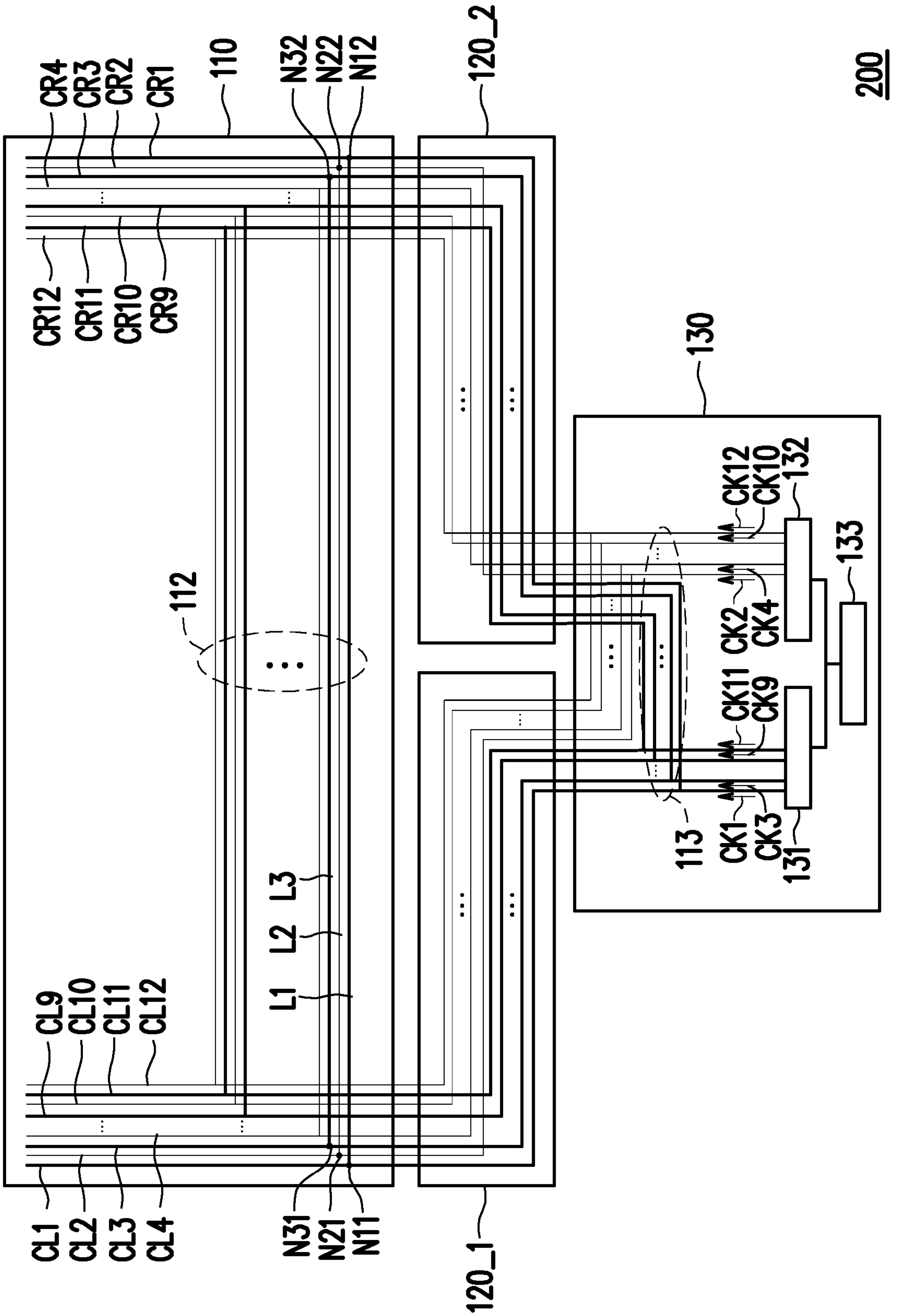
FIG. 2 is a schematic block view of an electronic device according to another embodiment of the disclosure.

FIG. 2 is a schematic block view of an electronic device according to another embodiment of the disclosure. Referring to FIG. 1 and FIG. 2, an electronic device 200 in the embodiment of FIG. 2 is similar to the electronic device 100 in the embodiment of FIG. 1. However, the main difference between the two is, for example, that the first frequency signals CK1, CK3, CK5, CK7, CK9, and CK11 and the second frequency signals CK2, CK4, CK6, CK8, CK10, and CK12 are input through the frequency signal lines arranged on the two opposite sides of the substrate 110 in an opposite order.

In this embodiment, the first frequency signals CK1, CK3, CK5, CK7, CK9, and CK11 and the second frequency signals CK2, CK4, CK6, CK8, CK10, and CK12 are input to the substrate 110 from the left side of the substrate 110 through the frequency signal lines CL1, CL2, CL3, CL4, CL5, CL6, CL7, CL8, CL9, CL10, CL11, and CL12 arranged on the substrate 110 in the first order. At the same time, the first frequency signals CK1, CK3, CK5, CK7, CK9, and CK11 and the second frequency signals CK2, CK4, CK6, CK8, CK10, and CK12 are also input to the substrate 110 from the right side of the substrate 110 through the frequency signal lines CR12, CR11, CR10, CR9, CR8, CR7, CR6, CR5, CR4, CR3, CR2, and CR1 arranged on the substrate 110 in a second order. That is to say, in this embodiment, the frequency signal lines inputting the first frequency signals CK1, CK3, CK5, CK7, CK9, and CK11 and the frequency signal lines inputting the second frequency signals CK2, CK4, CK6, CK8, CK10, and CK12 are arranged on the two opposite sides of the substrate 110 in different orders, from left to right are respectively CL1, CL2, CL3, CL4, CL5, CL6, CL7, CL8, CL9, CL10, CL11, and CL12 in the first order, and CR12, CR11, CR10, CR9, CR8, CR7, CR6, CR5, CR4, CR3, CR2, and CR1 in the second order, which may reduce the abnormal switching of the transistor coupled to the signal line 112 due to the signal line 112 being too long and the load being too high on the large-sized substrate 110, thereby reducing the issue that the optical characteristics of the electronic device 100 do not meet the requirements.

Therefore, the first frequency signals CK1, CK3, CK5, CK7, CK9, and CK11 and the second frequency signals CK2, CK4, CK6, CK8, CK10, and CK12 are input from the two opposite sides of the substrate 110 through the frequency signal lines arranged in different orders, which may correspondingly adjust a wiring layout on the circuit board 120_2, so that the wiring layout on the circuit board 120_2 is different from the wiring layout on the circuit board 120_2 in FIG. 1.

Figure 3:
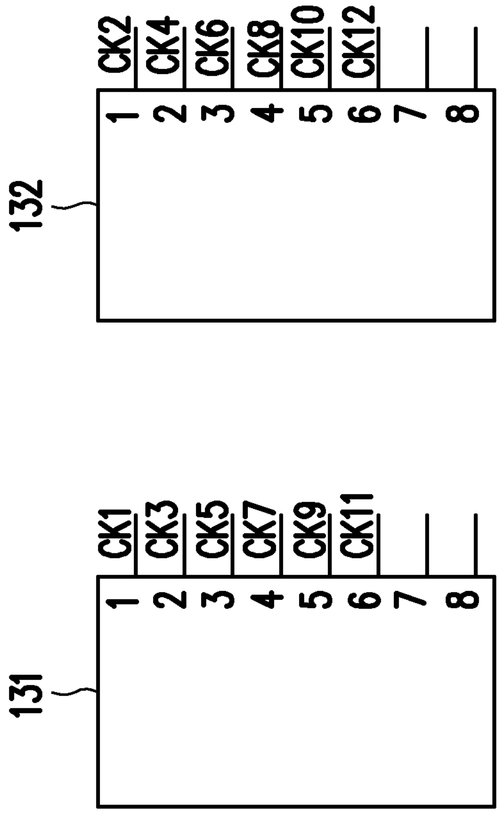
FIG. 3 is a schematic block view of a first level shifter and a second level shifter according to an embodiment of the disclosure.

FIG. 3 is a schematic block view of a first level shifter and a second level shifter according to an embodiment of the disclosure. Referring to FIG. 3, the first level shifter 131 and the second level shifter 132 are respectively implemented as different circuit chips, for example. The first level shifter 131 has eight pins. The first pin to the sixth pin output the first frequency signals CK1, CK3, CK5, CK7, CK9, and CK11 respectively. The second level shifter 132 has eight pins. The first pin to the sixth pin output the second frequency signals CK2, CK4, CK6, CK8, CK10, and CK12 respectively. The number of pins and the number of frequency signals are not intended to limit the disclosure.

Figure 4A:
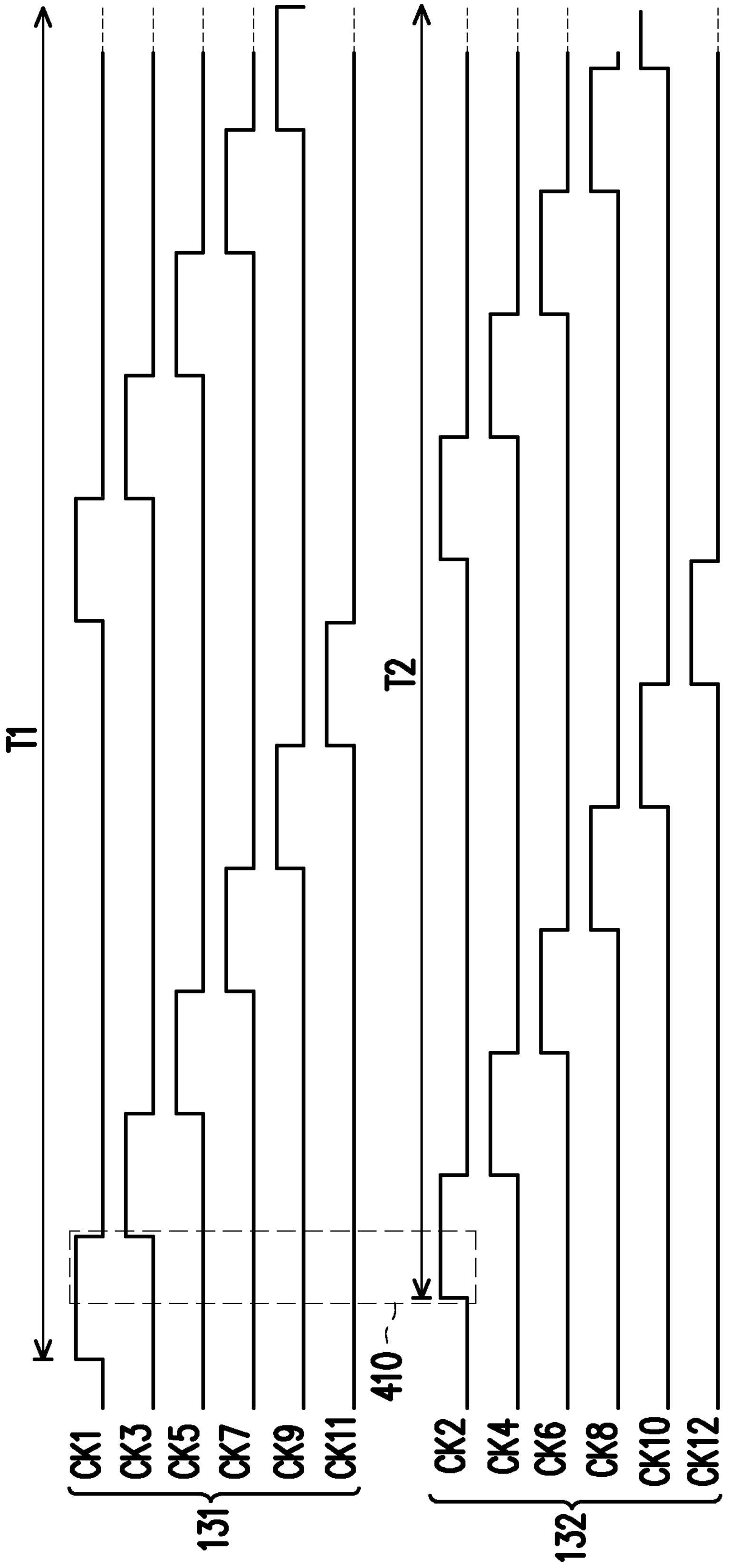
FIG. 4A is a schematic view of waveforms of a first frequency signal and a second frequency signal according to an embodiment of the disclosure.

FIG. 4A is a schematic view of waveforms of a first frequency signal and a second frequency signal according to an embodiment of the disclosure. Referring to FIG. 4A, in this embodiment, the first frequency signal CK1 of the first of the first frequency signals CK1, CK3, CK5, CK7, CK9, and CK11 and the second frequency signal CK2 of the first of the second frequency signals CK2, CK4, CK6, CK8, CK10, and CK12 partially overlap in time, as shown by a dashed box 410. In addition, the first frequency signals CK1, CK3, CK5, CK7, CK9, and CK11 do not overlap one another in time. Therefore, thermal energy generated by the first level shifter 131 during operation may be evenly dispersed in an operation period T1. The second frequency signals CK2, CK4, CK6, CK8, CK10, and CK12 also do not overlap one another in time. Therefore, the thermal energy generated by the second level shifter 132 during operation may be evenly dispersed in an operation period T2.

In this embodiment, the first frequency signals CK1, CK3, CK5, CK7, CK9, and CK11 do not overlap one another in time, and the second frequency signals CK2, CK4, CK6, CK8, CK10, and CK12 also do not overlap one another in time. Therefore, even if the electronic device 100 and the electronic device 200 are continuously operated, the temperature rise is relatively alleviated, which may reduce the influence on stability of the electronic device 100 and the electronic device 200.

Figure 4B:
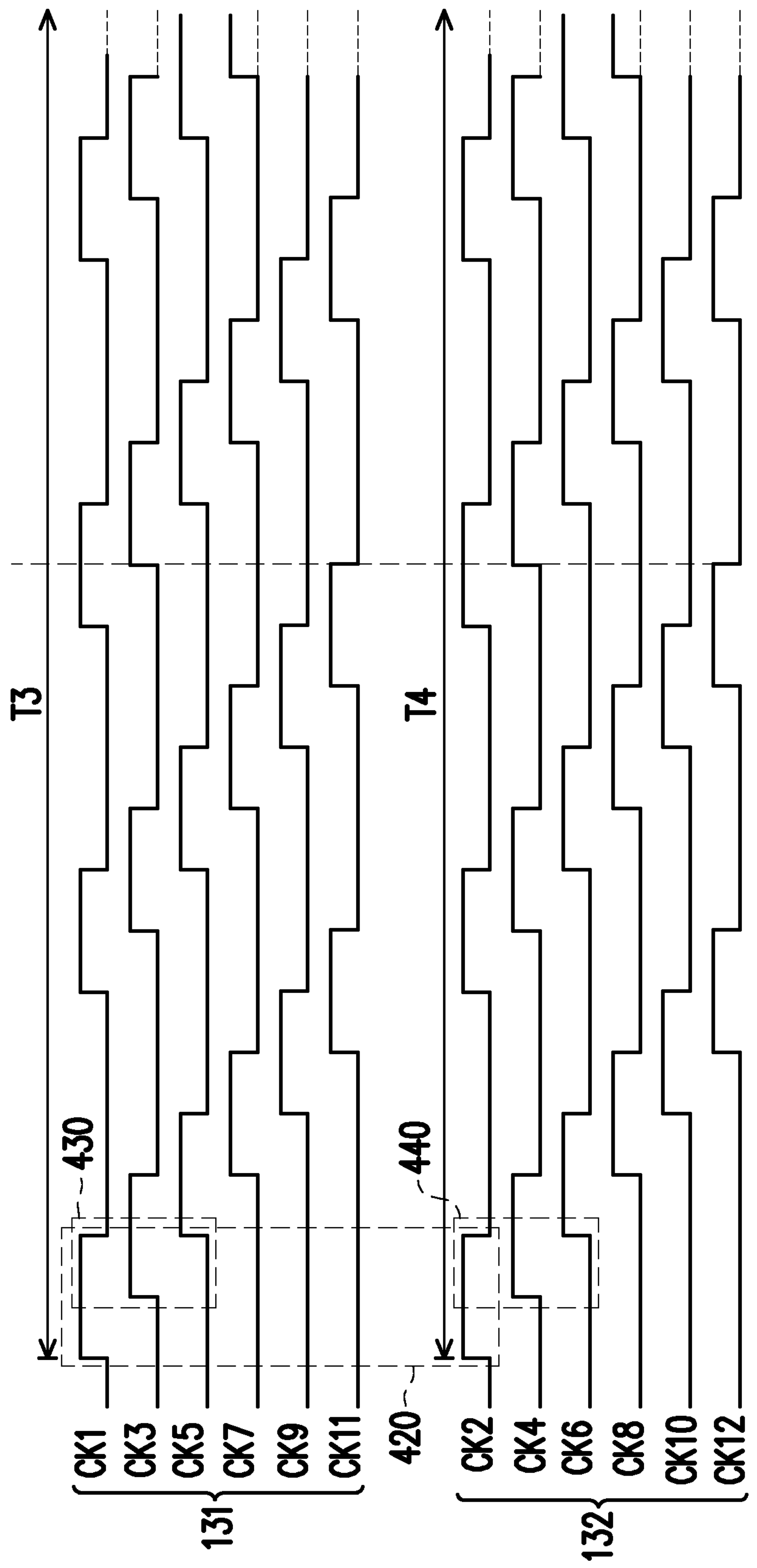
FIG. 4B is a schematic view of waveforms of a first frequency signal and a second frequency signal according to another embodiment of the disclosure.

FIG. 4B is a schematic view of waveforms of a first frequency signal and a second frequency signal according to another embodiment of the disclosure. Referring to FIG. 4B, in this embodiment, the first frequency signal CK1 of the first of the first frequency signals CK1, CK3, CK5, CK7, CK9, and CK11 and the second frequency signal CK2 of the first of the second frequency signals CK2, CK4, CK6, CK8, CK10, and CK12 completely overlap in time, as shown by a dashed box 420. In addition, the first frequency signals CK1, CK3, CK5, CK7, CK9, and CK11 partially overlap one another in time. As shown by a dashed box 430, the first frequency signal CK1 that is the first one and the first frequency signal CK3 that is the second one partially overlap in time. Therefore, heat generated by the first level shifter 131 may be evenly dispersed in an operation period T3. The second frequency signals CK2, CK4, CK6, CK8, CK10, and CK12 also partially overlap one another in time. As shown by a dashed box 440, the second frequency signal CK2 that is the first one and the second frequency signal CK4 that is the second one partially overlap in time. Therefore, the heat generated by the second level shifter 132 may be evenly dispersed in an operation period T4.

In this embodiment, the first frequency signals CK1, CK3, CK5, CK7, CK9, and CK11 partially overlap one another in time, and the second frequency signals CK2, CK4, CK6, CK8, CK10, and CK12 also partially overlap one another in time. Therefore, even if the electronic device 100 and the electronic device 200 are continuously operated, the temperature rise is relatively alleviated, which may reduce the influence on the stability of the electronic device 100 and the electronic device 200.

Figure 5:
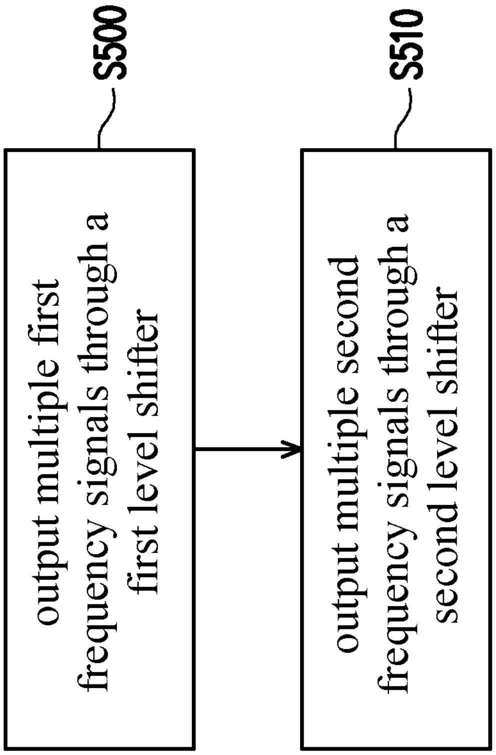
FIG. 5 is a flow chart of steps of an operation method of an electronic device according to an embodiment of the disclosure.

FIG. 5 is a flow chart of steps of an operation method of an electronic device according to an embodiment of the disclosure. Referring to FIG. 1, FIG. 2, and FIG. 5, the operation method of the electronic device in this embodiment is at least applicable to the electronic device 100 and the electronic device 200 in FIG. 1. Taking the electronic device 100 in FIG. 1 as an example, in step S500, the first frequency signals CK1, CK3, CK5, CK7, CK9, and CK11 are output through the first level shifter 131. In step S510, the second frequency signals CK2, CK4, CK6, CK8, CK10, and CK12 are output through the second level shifter 132. In addition, sufficient teachings, suggestions, and implementations concerning the operation method of the electronic device in this embodiment may be gained from the above descriptions in the embodiments of FIG. 1 to FIG. 4B.

Based on the above, in the embodiments of the disclosure, the first frequency signals and the second frequency signals are input from the two opposite sides of the substrate, which may improve convenience of the wiring layout, and may also reduce the abnormal switching of the transistor coupled to the signal line due to the signal line being too long and the load being too high on the large-sized substrate, thereby reducing the issue that the optical characteristics of the electronic device do not meet the requirements. In addition, the first frequency signals may not overlap or partially overlap one another in time, and the second frequency signals may also not overlap or partially overlap one another in time. Therefore, even if the electronic device is continuously operated, the temperature rise is relatively alleviated, which may reduce the influence on the stability of the electronic device.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, comprising:

a substrate;

a first signal line, a second signal line, and a third signal line disposed on the substrate, wherein each of the first signal line, the second signal line, and the third signal line has two endpoints, and the second signal line is disposed between the first signal line and the third signal line;

a first level shifter coupled to the first signal line and the third signal line, wherein the first level shifter outputs a plurality of first frequency signals to a first side of the substrate and a second side of the substrate, and the second side is opposite to the first side; and a second level shifter coupled to the second signal line, wherein the second level shifter outputs a plurality of second frequency signals to the first side of the substrate and the second side of the substrate, wherein the first level shifter is coupled to the two endpoints of the first signal line through a first frequency signal line and a fourth frequency signal line and the two endpoints of the third signal line through a third frequency signal line and a sixth frequency signal line, and the second level shifter is coupled to the two endpoints of the second signal line through a second frequency signal line and a fifth frequency signal line, wherein the first frequency signal line, the second frequency signal line and the third frequency signal line are arranged on the first side of the substrate in a first order along a direction, and the sixth frequency signal line, the fifth frequency signal line and the fourth frequency signal line are arranged on the second side of the substrate in the first order along the direction.

2. The electronic device according to claim 1, wherein the first of the first frequency signals and the first of the second frequency signals partially overlap in time.

3. The electronic device according to claim 2, wherein the first frequency signals do not overlap one another in time.

4. The electronic device according to claim 2, wherein the second frequency signals do not overlap one another in time.

5. The electronic device according to claim 1, wherein the first of the first frequency signals and the first of the second frequency signals completely overlap in time.

6. The electronic device according to claim 5, wherein the first frequency signals partially overlap one another in time.

7. The electronic device according to claim 5, wherein the second frequency signals partially overlap one another in time.

8. The electronic device according to claim 1, wherein one of the first frequency signals is input to the first signal line from the first side and the second side of the substrate simultaneously.

9. The electronic device according to claim 8, wherein the first frequency signals and the second frequency signals are input from the two opposite sides of the substrate in a same order.

10. An operation method of an electronic device, wherein the electronic device comprises a substrate, a first signal line, a second signal line, a third signal line, a first level shifter, and a second level shifter, wherein the first signal line, the second signal line, and the third signal line are disposed on the substrate, and the operation method comprises:

outputting a plurality of first frequency signals through the first level shifter to a first side of the substrate and a second side of the substrate, wherein the second side is opposite to the first side, wherein the first level shifter is coupled to two endpoints of the first signal line through a first frequency signal line and a fourth frequency signal line and two endpoints of the third signal line through a third frequency signal line and a sixth frequency signal line; and outputting a plurality of second frequency signals through the second level shifter to the first side of the substrate and the second side of the substrate, wherein the second level shifter is coupled to two endpoints of the second signal line through a second frequency signal line and a fifth frequency signal line, wherein the first of the first frequency signals and the first of the second frequency signals at least partially overlap in time, wherein the first frequency signal line, the second frequency signal line and the third frequency signal line are arranged on the first side of the substrate in a first order along a direction, and the sixth frequency signal line, the fifth frequency signal line and the fourth frequency signal line are arranged on the second side of the substrate in the first order along the direction.

11. The operation method of the electronic device according to claim 10, wherein the first frequency signals do not overlap one another in time.

12. The operation method of the electronic device according to claim 10, wherein the second frequency signals do not overlap one another in time.

13. The operation method of the electronic device according to claim 10, wherein the first of the first frequency signals and the first of the second frequency signals completely overlap in time.

14. The operation method of the electronic device according to claim 13, wherein the first frequency signals partially overlap one another in time.

15. The operation method of the electronic device according to claim 13, wherein the second frequency signals partially overlap one another in time.

16. The operation method of the electronic device according to claim 10, wherein the operation method further comprises:

inputting one of the first frequency signals to the first signal line from the first side and the second side of the substrate simultaneously.

17. The operation method of the electronic device according to claim 16, wherein the first frequency signals and the second frequency signals are input from the two opposite sides of the substrate in a same order.

18. The operation method of the electronic device according to claim 10, wherein each of the first signal line, the second signal line, and the third signal line has two endpoints, and the second signal line is disposed between the first signal line and the third signal line.

* * * * *